United States Patent Office 3,054,767
Patented Sept. 18, 1962

3,054,767
PROCESS COMPRISING BLENDING A HALOGENATED POLYMER WITH A FUSED POLYNUCLEAR HYDROCARBON
James Maurice Quinn, Tonawanda, N.Y., assignor to E. I. du Pont de Nemours and Company, Wilmington, Del., a corporation of Delaware
No Drawing. Filed Oct. 21, 1958, Ser. No. 768,560
6 Claims. (Cl. 260—33.6)

This invention relates to the manufacture of shaped articles of polymeric halogenated hydrocarbons. More specifically, it relates to the stabilization of the polymeric halogenated hydrocarbons, particuarly above their melting temperatures, for successful shaping into articles.

The invention will be described as it applies to polyvinyl chloride or copolymers of vinyl chloride having vinyl chloride as the major constituent, and their formation into films for use in packaging applications and the like. However, the invention is equally applicable to polymers and copolymers of vinyl fluoride and may be extended to include all polymeric materials whose thermal decomposition is at least partially attributed to the loss of halogen acid from the composition, thereby leading to discoloration; and the shaping of these polymeric materials into films, filaments, fibers, foils, coatings, etc. Besides polyvinyl chloride and polyvinyl fluoride, the invention applies to such polymeric materials as vinylidene chloride polymers, vinylidene chloride-vinyl chloride copolymers, vinylidene chloride-acrylonitrile copolymers, vinylidene fluoride polymers and copolymers, after-chlorinated polyvinyl chloride, chloroprene polymers, chlorosulfonated polyethylene and the like.

Polyvinyl chloride is characterized by poor thermal stability, particularly at temperatures above its melting point. Thermal decomposition is evidenced by a browning of the normally white polymer. As degradation continues the polymer becomes progressively darker until charring and substantial degradation occur. This lack of thermal stability presents a serious obstacle to the commercial exploitation of the polymer since the preferred methods of forming shaped structures involve the use of heat.

The object of the present invention is a substantially stabilized polymer that can be formed into shaped structures at elevated temperatures, e.g., by melt or plasticized extrusion, rolling, coalescence or solvent casting, without encountering the aforementioned difficulties. A further object is a polyvinyl chloride composition that can easily be melt-extruded into a useful film. Other objects will appear hereinafter.

The objects are accomplished by a composition of matter comprising the halogenated hydrocarbon polymer and at least one fused polynuclear aromatic hydrocarbon having a normal boiling point of at least 160° C.

The preferred halogenated hydrocarbon polymers are those in which the halogen has an atomic weight of 19–36.

By the expression "fused polynuclear aromatic hydrocarbon" is meant a compound consisting of carbon and hydrogen having a structure characterized by the presence of at least two rings, at least one of which is a 6-membered aromatic ring, which are joined by having two atoms in common. Thus, the fused polynuclear aromatic hydrocarbons for use in the present invention are composed of at least one 6-membered ring joined to an additional ring or rings, which additional ring or rings may be aromatic or aliphatic in character and not necessarily restricted to six carbon atoms. The mode of joining is such that at least two carbon atoms are common to the two joined ring structures. There should not be any vinyl unsaturation present in the polynuclear aromatic hydrocarbons. The absence of vinyl unsaturation renders the compound non-polymerizable and, hence, relatively insensitive to elevated temperatures. In this regard, it is also necessary to specify that the polynuclear aromatic hydrocarbon compounds must have a boiling point of at least about 160° C. in order to remain present at the temperatures ordinarily used in preparing shaped structures of polyvinyl chloride and the like.

The polynuclear compounds preferred in the present invention are selected from the group consisting of indene, naphthalene, alpha-methylnaphthalene, beta-methylnaphthalene, acenaphthene, fluorene, phenanthrene and anthracene. The structural formulae of these compounds are given below:

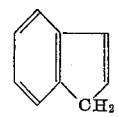  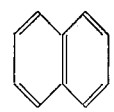

Indene  Naphthalene

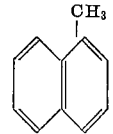  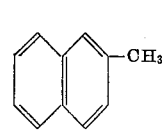

Alpha-methylnaphthalene  Beta-methylnaphthalene

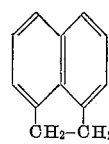  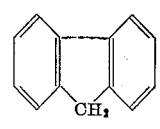

Acenaphthene  Fluorene

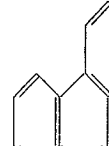  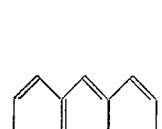

Phenanthrene  Anthracene

The amount of the fused polynuclear aromatic hydrocarbon stabilizer used, particularly for the melt-extrusion of polyvinyl chloride films, should be enough to provide adequate thermal stability during the forming operation but not enough to affect the properties of the resulting film adversely. Concentrations of at least 1% of the stabilizer, based on the weight of the stabilizer plus polymer, have been found most useful. The maximum used will depend on the process of forming the shaped structures. However, the maximum concentration of the stabilizer remaining in the ultimate product is preferably no greater than 15%. For extrusion operations where only a minor portion of the stabilizer would be lost by evaporation during the forming operation, up to 15% may therefore be used in the starting mixture. In solvent casting, dispersion coalescence, or plasticized extrusion, where a larger proportion of the stabilizer may be evaporated during formation of the shaped structure, a still higher concentration, e.g., up to 25%, may be used in the starting composition.

Besides improving thermal stability and lowering the melt viscosity of the polymeric halogenated hydrocarbons, the stabilizer compounds of the compositions of this invention provide other advantages. They are substantially inert chemically to normal compounding ingredients. They are compatible with the polymers over a wide range of compositions and therefore can be easily mixed uniformly with the polymers; also they show no tendency to exude to the surface of the ultimately produced polymeric articles. Thus, they do not interfere with post-processing operations such as the printing of films produced from these compositions. These fused polynuclear aromatic hydrocarbon compounds are essentially insoluble in water so that the final articles (films, filaments and the like) are not rendered water-sensitive by their presence. A unique feature of the compositions of this invention is the property of fluorescence under ultraviolet light or ionizing radiation. They may thus be used to detect such radiation. Most important, however, the films produced from these compositions are substantially clear, being virtually bubble-free and particle-free.

The process for forming shaped structures involves blending a mixture of the halogenated hydrocarbon polymer and at least one of the fused polynuclear aromatic hydrocarbons specified previously; then heating the mixture until it is converted into a homogeneous single phase composition; and, thereafter, forming the homogeneous single phase into a shaped structure and cooling the structure.

Specific embodiments falling within the definition of the process and composition of the invention will be apparent from the following examples. It is understood that the examples should not be considered to limit the scope of the present invention. In the examples, all parts are by weight unless otherwise specified.

*Example I*

A mixture was prepared from 90 parts (weight basis) polyvinyl chloride resin (the resin having an inherent viscosity of 1.21 deciliters per gram measured at 0.25% concentration in hexamethylphosphoramide at 30° C.) and 10 parts anthracene. A one gram sample of this mixture was pressed for 6 minutes at 210° C. between ferrotype plates under a total force of 30 tons. The resulting film was clear and transparent but had a somewhat brownish cast.

As a control, the anthracene was omitted. A one gram sample of the same polyvinyl chloride resin as above was pressed between ferrotype plates under a total force of 30 tons at 210° C. for 4 minutes. When examined, the sample had been converted to a brownish-black, charred, nearly opaque film containing numerous black particles.

*Example II*

A mixture consisting of 88 parts polyvinyl chloride resin, 10 parts anthracene and 2 parts "Lubricin" V-3 was prepared. The mixture was melted and extruded at a temperature of 195° C. through a conventional one-inch diameter extruder using a six-inch wide flat die at a throughput rate of 12 pounds per hour. The resulting film was transparent but had a somewhat brownish cast. Its tensile strength was 7,500 p.s.i., the elongation was 164% and the modulus was 346,000 p.s.i. The film was found to exhibit fluorescence when exposed to ultraviolet light.

*Example III*

A mixture consisting of 65 parts polyvinyl chloride resin, 5 parts anthracene and 30 parts dioctyl phthalate was prepared. This mixture was extruded at a temperature of 195° C. using the extruder described above. A tough, flexible film of excellent optical quality and which was free of discoloration was prepared. The extrusion was continued for a period of 30 minutes without the appearance of any discoloration in the film. Attempts to extrude a similar mixture from which the anthracene had been omitted were unsuccessful due to excessive degradation.

*Example IV*

A mixture consisting of 90 parts polyvinyl chloride and 10 parts acenaphthene was prepared. A film produced by melt pressing a one gram sample of the mixture for 6 minutes at 210° C. as described above was clear although somewhat discolored.

*Example V*

A mixture of 90 parts polyvinyl chloride resin and 10 parts phenanthrene was prepared. A one gram sample of this mixture was melt pressed for 6 minutes at 210° C. as described above. The resulting film was transparent although it appeared somewhat brown when viewed against a source of white light.

The compositions of this invention are useful in the preparation of shaped structures of all types. They are extremely useful in preparing films, filaments, fibers, foils and the like and as coatings for wood, metals, etc. However, their greatest utility is in the formation of self-supporting films for packaging applications. These films may be fabricated into sheets, envelopes, or tubes and used to package hardware items, greased or untreated machine parts and similar materials. In sheet form the film may be used as a base for adhesive tape, sound recording tape, etc.

The invention contemplates the use of the specified polynuclear aromatic hydrocarbon compounds as the essential additives to polymeric compositions. These compounds may be used singly or in mixtures thereof. The present invention also contemplates the use of other ingredients along with the essential aromatic additives provided such ingredients do not detract from the function of the aromatic additives. Thus, the addition of pigments, dyes, delustrants, plasticizers, latent solvents, fillers, lubricants, thermal stabilizers, photo stabilizers, etc. is understood to be within the purview of this invention.

What is claimed is:

1. A process for forming shaped structures which comprises blending a mixture of a halogenated polymer of a vinylidene monomer in which the halogen has an atomic weight of 19–36 and 1–25% by weight of a fused polynuclear hydrocarbon compound having a structure characterized by the presence of at least two rings, at least one of which is a 6-membered aromatic ring, which are joined by having two atoms in common and having a normal boiling point of at least 160° C.; heating said mixture to a temperature above the melting point of said polymer sufficient to convert the mixture into a homogeneous single phase composition containing polymer and a sufficient amount of said fused polynuclear hydrocarbon compound to prevent degradation of said polymer; forming said composition into a shaped structure while retaining a sufficient amount of said fused polynuclear hydrocarbon compound in said composition to prevent degradation of said polymer; and cooling said structure.

2. A process as in claim 1 wherein said polymer is polyvinyl chloride.

3. A process as in claim 1 wherein said polynuclear hydrocarbon compound is anthracene.

4. A process as in claim 1 wherein said polynuclear hydrocarbon compound is acenaphthene.

5. A process as in claim 1 wherein said polynuclear hydrocarbon compound is phenanthrene.

6. A process for forming a self-supporting film which comprises blending a mixture of polyvinyl chloride and 1–15% by weight of a fused polynuclear hydrocarbon compound selected from the group consisting of indene, naphthalene, alpha-methylnapthalene, beta-methylnaphthalene, acenaphthene, fluorene, phenanthrene and anthracene; heating said mixture to a temperature above the melting point of said polyvinyl chloride sufficient to convert the mixture into a homogeneous single phase composition containing polyvinyl chloride and a sufficient amount of said fused polynuclear hydrocarbon compound to prevent degradation of said polyvinyl chloride; extruding said composition in the form of a self-supporting film while retaining a sufficient amount of said fused polynuclear hydrocarbon compound in said composition to prevent degradation of said polyvinyl chloride; and cooling said film.

References Cited in the file of this patent

UNITED STATES PATENTS

| | | |
|---|---|---|
| 2,474,896 | Hauser | July 5, 1949 |
| 2,705,690 | Nelson et al. | Apr. 5, 1955 |
| 2,844,557 | Welch | July 22, 1958 |
| 2,868,742 | Burnham | Jan. 13, 1959 |
| 2,881,148 | Dilke | Apr. 7, 1959 |